(12) United States Patent  (10) Patent No.: US 8,425,109 B2
Foss  (45) Date of Patent: Apr. 23, 2013

(54) ICE FISHING HOLE MAINTENANCE SYSTEM

(76) Inventor: Daniel V. Foss, Apple Valley, MN (US)

( * ) Notice: Subject to any disclaimer, the term of this patent is extended or adjusted under 35 U.S.C. 154(b) by 937 days.

(21) Appl. No.: 12/079,712

(22) Filed: Mar. 28, 2008

(65) Prior Publication Data

US 2009/0241403 A1 Oct. 1, 2009

(51) Int. Cl.
A01K 97/01 (2006.01)
F04B 53/00 (2006.01)

(52) U.S. Cl.
USPC ............ 366/262; 366/266; 366/270; 261/84; 261/93

(58) Field of Classification Search .......... 366/262–266, 366/270; 261/84, 89–93
See application file for complete search history.

(56) References Cited

U.S. PATENT DOCUMENTS

| | | | | |
|---|---|---|---|---|
| 2,324,018 A * | 7/1943 | Petersen | | 209/169 |
| 3,387,401 A | 6/1968 | Stelmach | | 43/17 |
| 3,637,196 A * | 1/1972 | Kaelin | | 261/91 |
| 3,837,309 A * | 9/1974 | Biewer | | 114/265 |
| 4,131,107 A | 12/1978 | Godbout | | 126/271.2 R |
| 4,270,297 A | 6/1981 | Yates | | 43/4 |
| 4,848,918 A * | 7/1989 | Kingsley et al. | | 366/262 |
| 4,900,159 A * | 2/1990 | Jamison | | 366/343 |
| 4,945,668 A | 8/1990 | Keller | | 43/17 |
| 4,953,317 A | 9/1990 | Ruchel | | 43/17 |
| 4,980,986 A | 1/1991 | Harper | | 43/17 |
| 5,005,364 A * | 4/1991 | Nelson | | 62/76 |
| 5,472,278 A * | 12/1995 | Kawaoka et al. | | 366/262 |
| 5,598,656 A | 2/1997 | Strasser | | 43/17 |
| 5,851,066 A * | 12/1998 | Nocifora et al. | | 366/270 |
| 6,079,406 A | 6/2000 | Bryzek | | 126/271.1 |
| 6,093,374 A * | 7/2000 | Bukowsky | | 422/306 |
| 6,439,853 B2 * | 8/2002 | Tormaschy et al. | | 417/53 |
| 6,616,325 B1 * | 9/2003 | Brown | | 366/262 |
| 6,694,662 B1 | 2/2004 | McClure | | 43/4 |
| 6,981,346 B1 | 1/2006 | Wiezycki | | 43/4 |
| 7,331,704 B2 * | 2/2008 | Howk et al. | | 366/262 |
| 7,789,553 B2 * | 9/2010 | Tormaschy et al. | | 366/262 |
| 7,950,630 B2 * | 5/2011 | Curien | | 261/64.5 |
| 8,079,573 B2 * | 12/2011 | Visser | | 261/91 |
| 8,226,292 B1 * | 7/2012 | Walter et al. | | 366/262 |
| 2002/0109243 A1 * | 8/2002 | Vento | | 261/29 |
| 2003/0067839 A1 * | 4/2003 | McWhirter et al. | | 366/262 |
| 2004/0022122 A1 * | 2/2004 | Kozyuk | | 366/262 |
| 2004/0085856 A1 * | 5/2004 | Murosako | | 366/262 |
| 2007/0018680 A1 * | 1/2007 | Jeon et al. | | 324/770 |
| 2007/0159919 A1 * | 7/2007 | Kim et al. | | 366/147 |

* cited by examiner

Primary Examiner — Joseph Del Sole
Assistant Examiner — Nahida Sultana
(74) Attorney, Agent, or Firm — Mark A. Litman & Associates, P.A.

(57) ABSTRACT

A device and method prevents freeze over of a fishing hole cut through a layer of ice overlying a body of water. The device has a housing; a motor; at least one water inlet in the housing; at least one water outlet in the housing; and at least one water-moving element driven by the motor and moving water out of the at least one water outlet. The device may spin within the hole and stir water to prevent too rapid ice buildup.

9 Claims, 1 Drawing Sheet

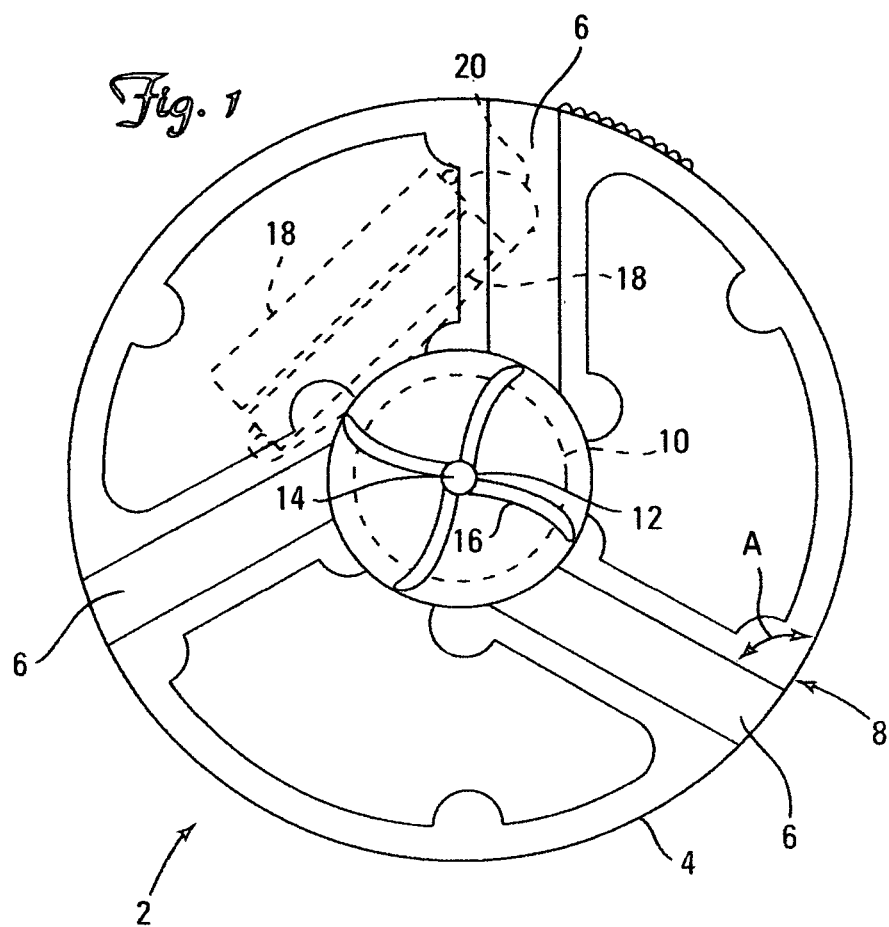
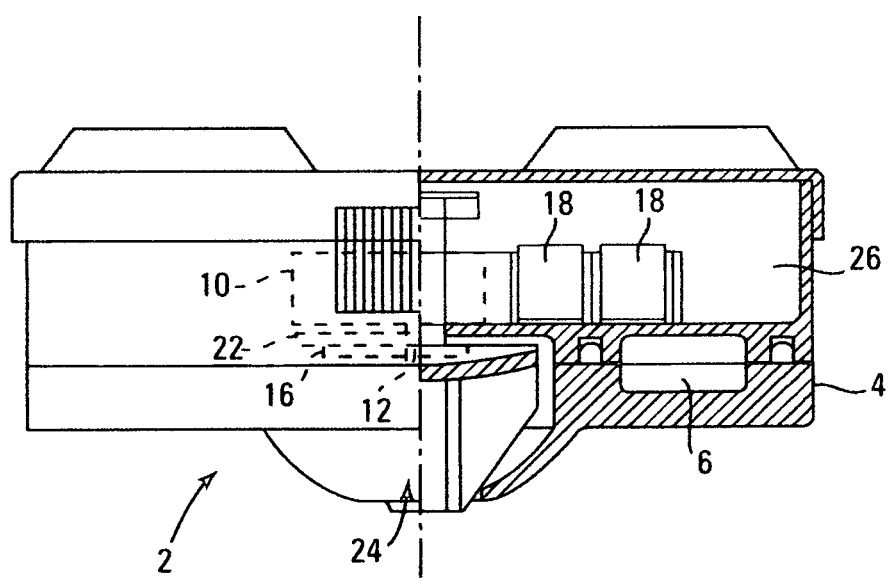

ICE FISHING HOLE MAINTENANCE SYSTEM

BACKGROUND OF THE INVENTION

1. Field of the Invention

The present invention relates to ice fishing, ice fishing devices, and systems for keeping an ice fishing hole open over an extended time period.

2. Background of the Art

A problem common in ice fishing is the tendency of the fishing hole to freeze over, requiring periodic cleaning of the fishing hole to keep it open. When the fishing hole is unattended, and a tip-up system is used, the freeze-up problem is compounded by heat conduction away from water in the ice fishing hole. In any event, cleaning the hole is a nuisance and frequently results in a disturbance of the fishing line, sometimes at inopportune moments. There are a number of different approaches that have been used to keep ice fishing holes open during use. One type of system directs or applies heat into the water in the ice fishing hole or against the ice, and the other method scoops ice from the hole to prevent ice build-up U.S. Pat. No. 6,981,346 describes an ice fishing hole strainer device for capturing and removing ice particles from a newly drilled ice hole.

U.S. Pat. No. 6,694,662 describes an ice-skimming device for removing ice particles from an ice-fishing hole. The ice-skimming device includes a housing for capturing the ice particles floating in an ice-fishing hole.

U.S. Pat. No. 4,270,297 (Yates) describes a system for ice fishing including a flexible tube filled with an antifreeze solution and through which a fish line extends, the tube being supported in a hole in the ice and the fish line extending through a trigger which releases a tip-up flag and actuates an electric lamp when the line is pulled down through the tube.

U.S. Pat. No. 4,953,317 describes an ice fishing assembly of a radiant energy absorbing bubble-like cover and paraphernalia resembling commonly employed ice fishing devices. The minimum apparatus of this invention consists in an somewhat irregular dome shaped cover that is made from any material that will absorb and transmit, to the air confined under the cover, impinging solar radiant energy. In operation, the cover is placed over an ice fishing hole and its enhanced-design ability to collect radiation assures that the water surface beneath the air space confined within the cover will remain unfrozen.

U.S. Pat. No. 3,387,401 is indicative of the state of the prior art. A pot loaded with a combustible fuel such as coal is used as a radiant heat source for keeping the water in an ice fishing hole from freezing. The same heat source warms water which flows through a coil to a location near the fishing reel to keep the reel from freezing. Additionally, a tip up mechanism is provided for notifying a fisherman that a fish has taken the bait.

U.S. Pat. No. 4,131,107 provides for a collapsible box containing a heat source and a hole contained in the cover for the fishing line. The device contains a bifurcated cover and a platform across the base for holding the heat source.

U.S. Pat. No. 4,945,668 provides a method for keeping the ice fishing hole free of ice. In the device, the heating element rests on a closed bottom portion and uses several baffles to direct heat throughout the container. The fishing reel of the device is connected to the inside of the cover and, therefore, must be lifted out of the enclosure upon a fish strike.

U.S. Pat. No. 4,980,986 describes a fishing apparatus intended primarily for ice fishing that has a housing, a windowed door on the housing, an angling aperture in a bottom of the housing, a reel inside the housing, a flagpole and an electric light on the outside of the housing, and discrete actuators for the flag and the light; the actuators are engaged by a spool of the reel as line is taken out by a fish, and the flagpole is released to pop up and/or the light is turned on. A transparent solar energy collecting panel is provided on one side and the top of housing enabling solar energy to be collected inside the housing, the housing keeps an ice fishing hole from freezing up.

U.S. Pat. No. 5,598,656 describes an ice fishing tip-up which includes an insulating heating structure integrated with a fish indicator. With the heating element in place, a cover is placed over the top surface of the enclosure to retain heat within the enclosure and prevent the ice fishing hole from freezing over.

It is known in the fishing art to employ a tubular member and a perforated member pivotally coupled thereto. The device also employs a flexible rod positioned in a housing to effectuate movement of the perforated member with respect to the tubular member. Although the device is useful for its intended purpose, it requires both hands of a user in its operation. Additionally, water trapped between the flexible rod and the housing may become frozen preventing the device from being used.

U.S. Pat. No. 6,079,406 (Bryzek) describes an apparatus for warming water in an ice fishing hole. The apparatus includes a support, closed heat-transfer liquid conduit and heated liquid circulated throughout the conduit. The conduit includes at least one loop portion for extending along the ice edge substantially at the water level. Radiant heat energy from the loop portion warms water in the ice fishing hole. The novel design of the apparatus permits an angler to fish at the same time the apparatus operates to warm water in the ice fishing hole. Each of these references is incorporated by reference in their entirety for their disclosure of technology, components and materials.

SUMMARY OF THE INVENTION

A device for preventing ice fishing hole freeze and closing comprising:
 a) a housing;
 b) a motor;
 c) at least one water inlet in the housing;
 d) at least one water outlet in the housing;
 e) at least one water-moving element driven by the motor and moving water out of the at least one water outlet.
A power source is connected to the motor during use. The device floats or is supported in the ice hole water by the moving water from the device.

BRIEF DESCRIPTION OF THE FIGURES

FIG. 1 shows a top view of a device for keeping water from freezing in an ice fishing hole.

FIG. 2 shows a side cutaway view of a device for keeping water from freezing in an ice fishing hole.

DETAILED DESCRIPTION OF THE INVENTION

A device is designed for preventing ice fishing hole freeze-up and closing while the hole is being used for ice fishing. The device has at least five components:
 1) a housing;
The housing contains working components and keeps the device supported in the water. Preferably the housing and all contained components is sufficiently buoyant that it does not sink easily. The device will of course be in the water and can bob up and down during use, so that it is temporarily submerged, but it must remain near the surface of the water. It is possible for floats to be attached to the housing and evice that support the device so that it is retained close to the surface, even if it would sink without the floats. The structural material of the housing should be water-durable, such as with lightweight metal, composite or plastic. The shape of the housing is a choice of the designer, but a simple circular, elliptical, square or irregular shapes my be used.

2) a motor;

The motor, as explained later, drives elements within or on the device to move water out of the device. It should be protected or encapsulated or contained to prevent it from being damaged by water, and it does not have to be particularly powerful, such as a lightweight electrical motor as would be used by hobbyists or in small toys. The motor is preferably a DC electrical motor that may be powered by a low power battery, such as a 1.5 Volt AA or AAA battery or 4.5V battery or 9V battery and the like. The motor should be able to turn a shaft or drive in the housing in the water moving function at least 15 rpm, preferably at least 60 rpm and 360 rpm or more.

3) at least one water inlet in the housing;

The at least one water inlet allows water to flow or be drawn into the housing and then moved by a water-moving component or element to vents or outlets carrying the water outside of the device housing. The inlet may be on the side of the housing and/or the bottom of the housing or any other location where water is in regular or consistent contact with the inlet.

4) at least one water outlet in the housing;

The at least one outlet may be on the bottom and/or sides of the housing. Preferably the outlets or vents are located at least on the side of the housing, as this location causes the water moving out of the housing to drive and move the device. It is preferred that the outlets are angled (different than perpendicular) with respect to the side surface. For example, the angle of water flow out of the outlet as it leaves the side of the housing may be at less than or greater than 85, 80, 75, 65, 60, 55, 50 or 45° with respect to the surface of the side (that is, between 5 and 175°, but preferably not at exactly 90°. There are preferably more than one outlet, and more than four outlets tends to be superfluous. The motor should be able to move at least 0.5 mL of water/second out of the total number of outlets. By having the vents sloped or angled, the water tends to rotate or spin in the ice fishing hole. It is this movement of the device that stirs the water and reduces the ability of the water to freeze up and close. The outlet(s) and the inlet may be the same conduit or vent in the device, as cavitation and bubbles and pressure disturbances caused by water being drawn (by replacing air or reduced pressure behind removed water) is not critical to the performance of the device. At least separate inlets and outlets may be preferred (e.g., the inlet being on a relative plane somewhat above or below or level with the plane of the outlets).

5) at least one water-moving element driven by the motor and moving water out of the at least one water outlet.

A power source is connected to the motor during use. The device floats or is supported in the ice hole water by the moving water from the device. A small electric motor is preferred, preferably battery powered, although external wires to a battery or electrical source could be used (although this is less preferred because of possible entangling of the wires with fishing lines. The motor should be lightweight (such as between 10 and 100 grams) and does not have a high power requirement, as it needs to move small amounts of water at a small speed on an essentially relatively level plane (that is, the motor doesn't have to lift water significant amounts, but merely push, pull and/or stir the water). The water moving element itself is a fan, paddles, propeller and the like that pulls and/or pushes water to move it out of the at least one outlet and may draw water into the inlet also.

These and other aspects of the invention will be shown in the Figures.

FIG. 1 shows a top view of a device 2 for keeping water from freezing in an ice fishing hole. The device 2 is shown with a housing 4 having three water outlets or channels 6 that are at an angle A with the surface 8 of the housing 4. Moving water within the device 2 is a motor 10 connected through a shaft or other linkage 12 to a propeller 14 having four blades 16. The number and slope and arc of the blades is optional, and a few as a single blade may be used. The blades 16 are shown on a support plate 22 for stability. Two AAA batteries 18 are shown with lead lines 20 to the motor 10. The batteries may be supported in a water secure segment of the device 2 and on the same or different plane within the housing 4 as the propellers 16 and outlets 6. In this view of FIG. 1, the batteries 18 are shown on a plane below the plane of the propellers 16. The water that is present adjacent the propellers 16 and within the outlet channels 6 is moved out of the device 2 at an approximate angle A and therefore causes the device 2 to rotate in a clockwise direction. The device will gently rotate and move within the ice fishing hole, brushing or even rolling against the side of the ice fishing hole to prevent the ice growth from closing the hole. There is not necessarily any specific intent to add heat to the water in the hole by electrical resistance or other means, although there is some incidental heat released by the motor. Additionally, the kinetic activity of the moving water and moving device adds calories (joules) to the water in the ice fishing hole.

FIG. 2 shows a side cutaway view of a device 2 for keeping water from freezing in an ice fishing hole. The housing 4 is shown containing a separate, water-tight zone or compartment 26 for the batteries 18. The batteries 18 drive the motor 10 connected to shaft 12 which in turn rotates the support plate 22 and the propellers 16. This rotation of the propellers 16 moves the water out of outlet 6. A lower inlet 24 is shown on a submergible side of the device 2. The device may be free-standing within the ice hole, operating independently (not secured to) any other device, such as the fishing pole or line. A line or wire connecting the device to the ice may be used as a tether or other securing device to prevent the device from sinking if minor leakage occurs. The leakage can then be repaired after the device is pulled out of the water.

The device is able to continue operation on its own, once started. The device will move about the hole and glance off the fishing line as well as the walls, without interfering with the fishing experience. The side walls of the device should be smooth to avoid snags with the fishing line. The intake ports or inlets on the device may be located where relatively warmer water is drawn into the device (e.g., from below the ice hole) and is then expelled towards the surface of the water in the hole to further act to keep the ice hole open.

Although specific sizes, power, orientations, and materials are described in certain section of the technology described herein, these specifics should be regarded as exemplification of generic concepts of the technology disclosed and claimed herein.

What is claimed is:

1. A device for preventing freeze over of a fishing hole cut through a layer of ice overlying a body of water, comprising:
   a) a housing;
   b) an electric motor and battery;
   c) at least one water inlet in the housing;

d) at least one water outlet in the housing; and
e) at least one water-moving element driven by the motor and moving water out of the at least one water outlet;

wherein the housing comprises a single cylindrical element and internal components comprising the motor, the battery, the water moving element, the at least one water outlet and the at least one water inlet that are all surrounded by the single cylindrical element and a shaft connecting the motor to a propeller are entirely within the housing and the housing and internal components are constructed to float and move within the fishing hole wherein the housing and the internal components within the housing are constructed so that upon movement of water through the water outlet, the entire housing and internal components rotate and freely move within the fishing hole.

2. A device for preventing freeze over of a fishing hole cut through a layer of ice overlying a body of water, comprising:
a) a housing;
b) an electric motor and battery;
c) at least one water inlet in the housing;
d) at least one water outlet in the housing; and
e) at least one water-moving element driven by the motor and moving water out of the at least one water outlet;

wherein the housing comprises a single cylindrical element and internal components comprising the motor, the battery, the water moving element, the at least one water outlet and the at least one water inlet that are all surrounded by the single cylindrical element and a shaft connecting the motor to a propeller are entirely within the housing and the housing and internal components are constructed to float and move within the fishing hole wherein the housing and the internal components within the housing are constructed so that upon movement of water through the water outlet, the entire housing and internal components rotate and freely move within the fishing hole.

3. The device of claim 1 wherein the device can float in fresh water for at least one hour without sinking.

4. The device of claim 3 wherein the at least one water outlet exits the housing at an angle greater than 90° and less than 180° with respect to an exterior surface of the housing, wherein there are at least two water outlets in the housing, and wherein the motor is an electric motor and batteries are present within the housing to power the electric motor.

5. The device of claim 1 wherein the single cylindrical element is plastic and the motor is a DC motor with a 9V battery.

6. The device of claim 1 wherein there are at least two water outlets in the housing, and each water outlet is a channel consisting of a linear path from an exterior surface of the housing to the propeller.

7. The device of claim 2 wherein there are at least two water outlets in the housing, and each water outlet is a channel consisting of a linear path from an exterior surface of the housing to the propeller.

8. The device of claim 3 wherein there are at least two water outlets in the housing, and each water outlet is a channel consisting of a linear path from an exterior surface of the housing to the propeller.

9. The method of claim 5 wherein the motor is powered by multiple batteries internal to the housing.

\* \* \* \* \*